(12) United States Patent
Bai et al.

(10) Patent No.: US 9,960,974 B2
(45) Date of Patent: May 1, 2018

(54) DEPENDENCY MAPPING AMONG A SYSTEM OF SERVERS, ANALYTICS AND VISUALIZATION THEREOF

(71) Applicant: International Business Machines Corporation, Armonk, NY (US)

(72) Inventors: Kun Bai, Elmsford, NY (US); Christian B. Kau, Los Altos, CA (US); Mark E. Podlaseck, Kent, CT (US); Michael Tacci, Downingtown, PA (US); Lawrence H. Thompson, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 14/091,797

(22) Filed: Nov. 27, 2013

(65) Prior Publication Data
US 2014/0164607 A1 Jun. 12, 2014

Related U.S. Application Data

(60) Provisional application No. 61/731,656, filed on Nov. 30, 2012.

(51) Int. Cl.
*H04L 12/26* (2006.01)
*H04L 12/24* (2006.01)
*G06F 3/0484* (2013.01)

(52) U.S. Cl.
CPC ........ *H04L 43/045* (2013.01); *H04L 41/0853* (2013.01); *H04L 41/14* (2013.01); *H04L 43/0817* (2013.01); *G06F 3/04847* (2013.01); *H04L 41/145* (2013.01); *H04L 41/147* (2013.01)

(58) Field of Classification Search
CPC ..... H04L 43/045; H04L 41/12; H04L 41/069; H04L 41/0659; H04L 41/0233; G06F 17/30342
USPC ............................ 709/224; 707/739, 999.01
See application file for complete search history.

(56) References Cited

U.S. PATENT DOCUMENTS

| | | | | |
|---|---|---|---|---|
| 6,859,929 B1* | 2/2005 | Smorodinsky | ........ | G06F 9/5061 718/105 |
| 7,933,987 B2* | 4/2011 | Aidun | ................ | G06F 11/2025 709/203 |
| 2005/0154735 A1* | 7/2005 | Breh | .................... | H04L 41/0233 |
| 2009/0070455 A1* | 3/2009 | Cervantes | ............. | H04L 41/069 709/224 |
| 2010/0153771 A1* | 6/2010 | Gordon | .............. | G05B 19/4185 714/4.1 |
| 2010/0223096 A1* | 9/2010 | Bosan | .................... | G06Q 30/02 705/14.64 |

(Continued)

*Primary Examiner* — Ranodhi Serrao
*Assistant Examiner* — James Fiorillo
(74) *Attorney, Agent, or Firm* — Scully, Scott, Murphy & Presser, P.C.; Louis J. Percello, Esq.

(57) ABSTRACT

Analytics and visualization for logical dependency mapping of computer servers may be provided. Data collected from computer servers is received and analyzed to discover logical dependencies among the computer servers, for example, to discover communications between one or more of operating systems, middleware and applications associated with the computer servers. The computer servers may be grouped into one or more dependency groups based at least on a user-defined grouping criterion. The one or more dependency groups and their logical dependencies may be output.

17 Claims, 12 Drawing Sheets

(56) References Cited

U.S. PATENT DOCUMENTS

| | | | |
|---|---|---|---|
| 2011/0196959 A1* | 8/2011 | Devarakonda | H04L 41/12 709/224 |
| 2013/0054601 A1* | 2/2013 | Whitlock | G06F 17/30342 707/737 |
| 2013/0246838 A1* | 9/2013 | Reddy | H04L 41/0659 714/3 |
| 2013/0282889 A1* | 10/2013 | Tito | H04L 43/00 709/224 |
| 2017/0285923 A1* | 10/2017 | Giral | G06F 3/04847 |

* cited by examiner

DEPENDENCY MAPPING AMONG A SYSTEM OF SERVERS, ANALYTICS AND VISUALIZATION THEREOF

CROSS-REFERENCE TO RELATED APPLICATIONS

This application claims the benefit of U.S. Provisional Application No. 61/731,656, filed on Nov. 30, 2012, which is incorporated by reference herein in its entirety.

FIELD

The present application relates generally to computers, and computer applications, and more particularly to dependency mapping among a system of servers.

BACKGROUND

An organization's information technology (IT) infrastructure may contain a large and complex set of computer servers. Determining which servers are related or have dependence on which other servers in the IT infrastructure may pose a challenge. In the present disclosure, analytics and visualization for dependency mapping among system of servers may be provided.

BRIEF SUMMARY

A method of creating a logical dependency mapping of computer servers, in one aspect, may comprise allowing a data collection utility to run on the computer servers to collect data. The method may also comprise receiving the data collected from the computer servers. The method may further comprise discovering logical dependencies among the computer servers by analyzing the data for communications between one or more of operating systems, middleware and applications associated with the computer servers. The method may also comprise grouping the computer servers into one or more dependency groups based at least on a user-defined grouping criterion. The method may further comprise outputting the one or more dependency groups including at least the logical dependencies.

A system for creating a logical dependency mapping of computer servers, in one aspect, may comprise a processing engine operable to execute on a processor and further operable to receive data collected from the computer servers. The processing engine may be further operable to discover logical dependencies among the computer servers by analyzing the data for communications between one or more of operating systems, middleware and applications associated with the computer servers. The processing engine may be further operable to group the computer servers into one or more dependency groups based at least on a user-defined grouping criterion. The processing engine may be further operable to output the one or more dependency groups including the logical dependencies. A web-based graphical user interface may be operable to execute on a processor, wherein the processing engine receives the data via the web-based graphical user interface. A storage device may comprise a database repository for storing the one or more dependency groups including the logical dependencies.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Logical dependency mapping of servers and visualization thereof may be provided.

An aspect of the present disclosure includes a system and method that obtain data and create analysis necessary to define groupings of information technology (IT) infrastructure servers, referred to as dependency groups, for example, which may be utilized to allow their physical and logical migration while maintaining the logical integrity and operations of the IT infrastructure.

Logical server dependencies refer to the server to server communications originating from operating systems, middleware, or application communications, or other elements of a server.

A dependency group is a collection of servers, which establish logical communications with each other either in a "one to one" or "one to many" relationship. The dependencies are required to be maintained after the migration is completed in order for the IT infrastructure to operate as required.

Some server to server dependencies are considered to be extraneous to the analysis where the dependency can be maintained in the new infrastructure regardless of how the IT infrastructure is migrated. Examples include dependencies on domain name system (DNS) and Lightweight Directory Access Protocol (LDAP) servers.

The data that is obtained to create a dependency group may include 1) configured dependencies where a server is configured to establish a communication with a paired server, 2) observed server to server communications and 3) analysis of the systems log files to identify prior server to server communications.

The system and method of the present disclosure in one embodiment may interrogate each server to understand which forms of dependencies exist by testing for the presence of a predefined set of server components including for example operating systems, middleware and applications. Based on the presence of the discovered components the system and method of the present disclosure in one embodiment then collects the specific data from each server.

In one aspect, the system and method do not significantly impact the operation or performance of the server while the system and method is operating. The system and method have no impact on the security characteristics or polices of the IT infrastructure as the system and method may be provided to the infrastructure owners who already have the required security access.

The data may be consolidated and analysis may be performed to create the dependency groups. Dependency groups may be then described in a set of outputs, for example, including graphical depictions and tabular data formats.

A practitioner planning an IT infrastructure migration may then plan the migration in such a way to as to maintain the integrity defined in each dependency group.

Figure 1:
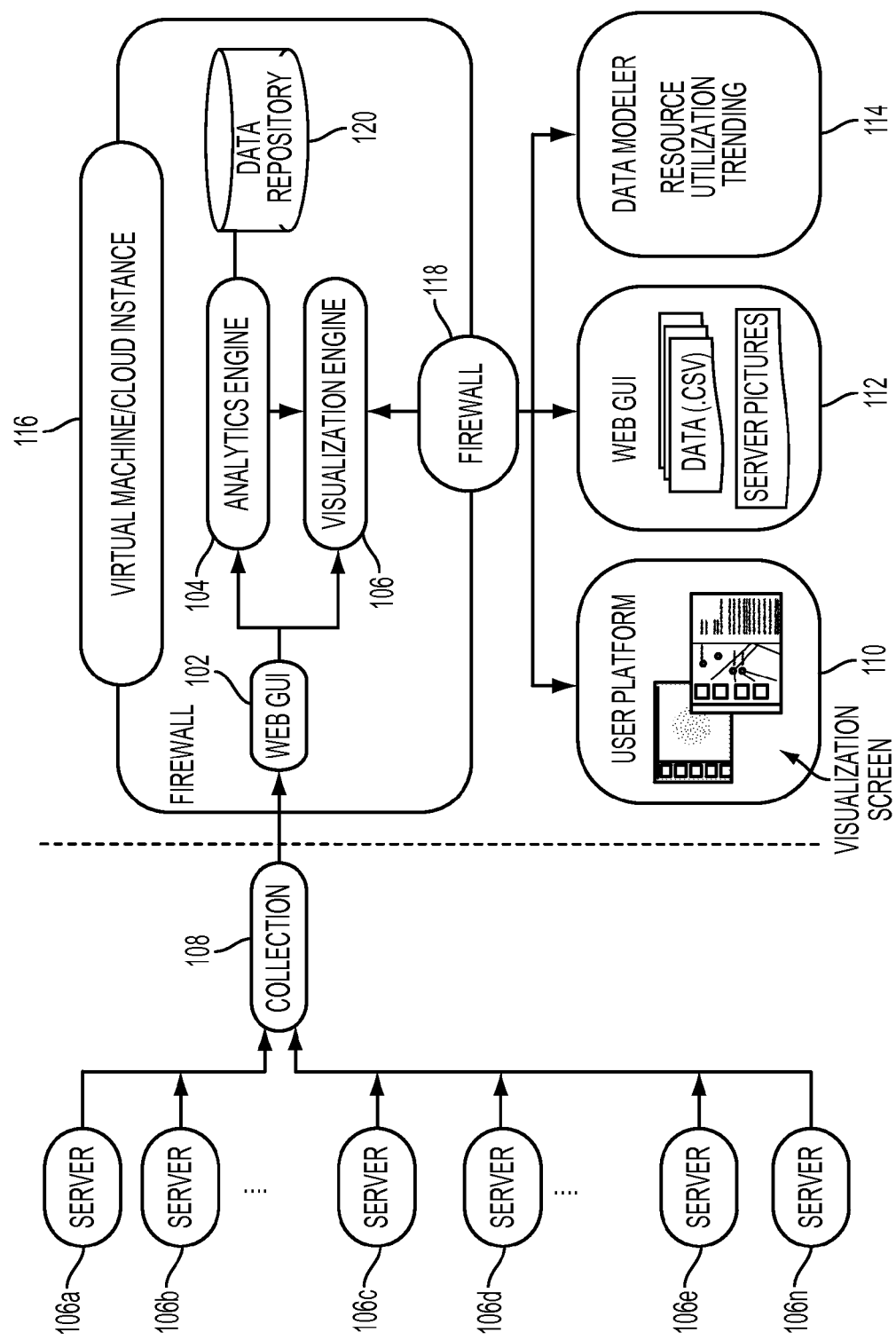
FIG. 1 is a diagram that illustrates an architectural overview of an analytics for logical dependency mapping (ALDM) of the present disclosure in one embodiment.

FIG. 1 is a diagram that illustrates an architectural overview of an analytics for logical dependency mapping (ALDM) of the present disclosure in one embodiment. A script or a computer program or the like may be provided to run on a plurality servers 106a, 106b, 106c, 106d, 106e, . . . , 106n to collect data from those servers. The collected data 108 may be transmitted for processing, for example, for analytics and visualization. In one embodiment, a data 108 may be received via a web-based interface such as a web graphical user interface 102. An analytics engine 104 processes the received data for analytics, e.g., storing the data and the processed results in a data repository 120. A visualization engine 106 uses the data processed by the analytics engine 104 to provide a visualized output.

In one embodiment, the analytics engine 104, visualization engine 106 and the user interface 102 may run as a virtual machine on a cloud-based system 116, e.g., IBM SmartCloud Enterprise RHEL 64 bit/IBM X/P series instance, from International Business Machines (IBM) of Armonk, N.Y.

The visualization data may be provided to a user platform 110 remotely via a firewall 110, to a Web GUI 112, and to a data model 114 that may perform resource utilization trending functionalities. Visualization may be provided that may include one or more of visualization related to gravity, tree map, shading, and visual clues.

Figure 2:
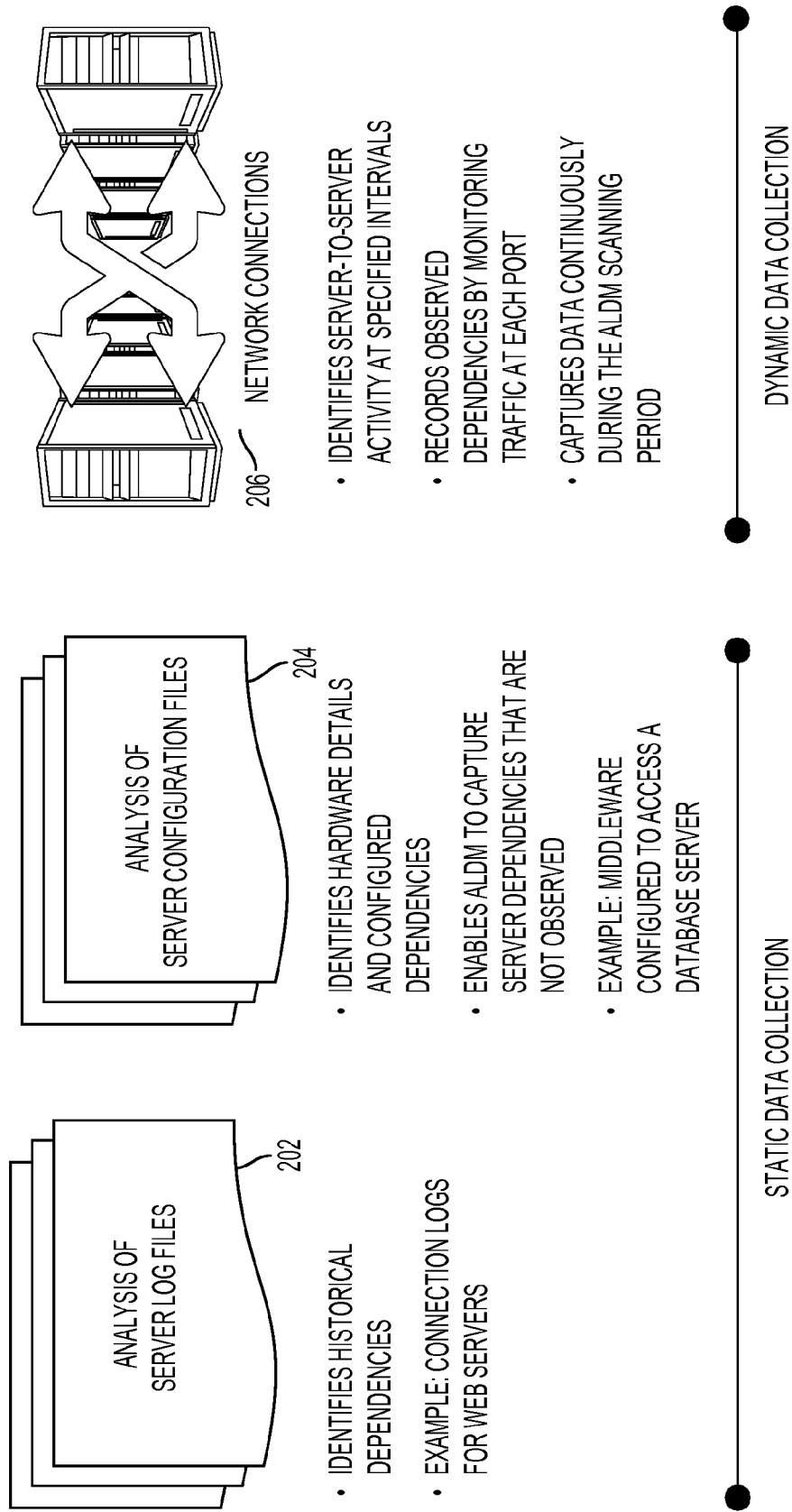
FIG. 2 illustrate is a diagram that illustrates an overview of data collection in one embodiment of the present disclosure.

As described above, the processing engine 104 may receive data files via the web-based interface 102. It should be understood that the processing engine 104 may receive the data via another known or will be known mechanisms other than specifically by using the web-based interface 102. Such data may be collected from the servers that are subjects of the analysis, e.g., using static data collection, dynamic data collection or combinations of both. FIG. 2 illustrate is a diagram that illustrates an overview of data collection. The data collection may be performed by running scripts or program codes or the like on the machines or servers. Static data collection may include analysis of server log files 202, for example, to identify historical dependencies among different servers. Connection logs for web servers are an example of logs that identify historical dependencies. Static data collection may also include analysis of server configuration files 204, for example, to identify hardware details and configured dependencies. Such analysis may allow the analytics for logical dependency mapping (ALDM) of the present disclosure to capture server dependencies that are not observed. Middleware configuration file that specifies middleware configured to access a database server is an example of a server configuration file. Dynamic data collection may include monitoring network connections 206 on an on-going basis, e.g., continuously or periodically over a period of time. Dynamic data collection may identify server-to-server activity at specified intervals, record observed dependencies by monitoring traffic at each port, and capture data continuously during the ADLM scanning period. The collected data in one aspect does not include specific application or user data.

The analytics for logical dependency mapping of the present disclosure may require no credentials yet produces sufficient information to plan many types of IT optimization projects including, for example: IT infrastructure consolidation and relocation (migration); Middleware optimization and reclamation; IT infrastructure risk analysis; and potential server virtualization identification.

The analytics for logical dependency mapping's dynamic visualization may provide the ability to quickly see customized perspectives of the infrastructure (e.g., filter to show only selected items, e.g., show only the DB2 servers) and create a platform for dynamic management of data. The dynamic visualization may be extensible to data input operations required in implementing data center consolidation and relocation plans. DB2 is a family of relational database management system (RDBMS) products from International Business Machines Corporation (IBM®) of Armonk, N.Y.

In one aspect, the ALDM and its visualization utility may be deployed by a user such that the user retains control of the script operations that are running on the user's servers.

Figure 3:
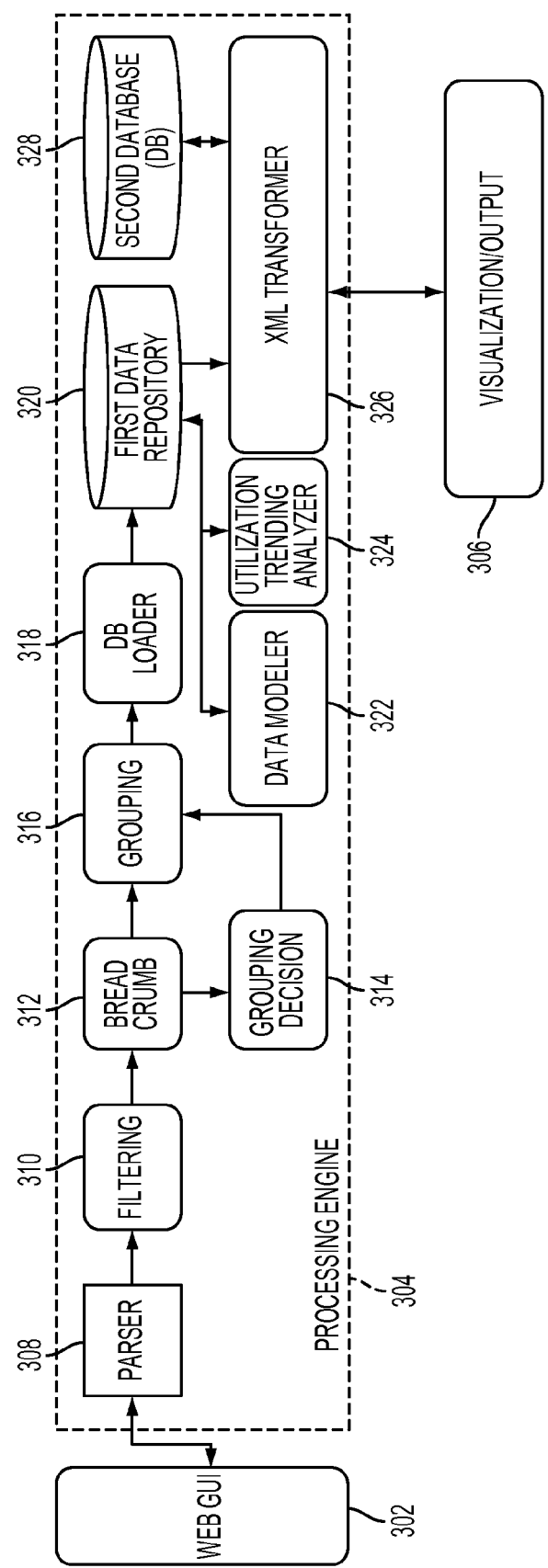
FIG. 3 is a diagram illustrating a data processing work flow for performing analytics for logical dependency mapping in one embodiment of the present disclosure and data processing components that perform the analytics in one embodiment of the present disclosure.

FIG. 3 is a diagram illustrating a data processing work flow for performing analytics for logical dependency mapping in one embodiment of the present disclosure and data processing components that perform the analytics in one embodiment of the present disclosure, e.g., the analytics engine shown at 104 in FIG. 1.

A Web graphical user interface (GUI) 302 provides a web based interface allowing users to have access to the system (e.g., a processing engine 304) for performing dependency analytics, upload the data files created by the system, select processing options, initiate the processing and download the results at the conclusion of the processing.

In one embodiment, the processing engine 304 may be implemented as a Cloud instance, or kernel-based Virtual Machine (KVM) or like hypervisor, or one or more computer modules stored and executed from a Universal Serial Bus (USB) on a stick. The processing engine 304 may include a parser 308, a filtering code 310, a breadcrumb code 312, a grouping decision module 316, a database loader (DB loader) 318, Web-based graphical user interface 302, a first repository 320 (e.g., DB2 database), a data modeler 322 that may format or model data, a utilization trending analyzer 324, a second repository 328 (e.g., a document-oriented database program may be used) that may store data in core data format ready for visualization engine to process, and an extensible markup language (XML) data transformer 326.

The parser 308 provides a processing technique to extract and format only the necessary data from the total set of data collected. This processing technique includes discovery of relationships which describe dependencies from server to server configurations. For example, the parser 308 processes the collected server information one server by one server. For example, the parser 308 processes "netstat" (a common Unix/WINDOWS command to obtain server's networking connection information), which has the source IP/PORT and destination IP/PORT information that reveals the server to server relationship. These IP/PORT pairs are maintained in the global table.

The filtering code or module 310 based on user defined dependency types may filter or exclude extraneous dependencies from the processing, e.g., by filtering those extraneous information from the relationships discovered in the parser 308. User defined dependency types to be filtered may be provided or specified in a file or computer consumable data, which the filtering code may read. Examples of filtered data may include: 1) dependencies on common and redundant technologies which exist in the IT infrastructure but are not considered critical to the work for which ALDM is deployed, for example, DNS or LDAP servers may be considered redundant; and 2) dependencies which a user deems to be non-critical for the purpose which ALDM was deployed, for example, dependencies on servers or server installed technologies that are out of scope for the project. The filtering, e.g., performed by the filtering code 310 reduces the number of non-critical dependencies so a practitioner or user can focus on the subset of dependencies which affect the project outcome.

The breadcrumb code or module 312 may allow for multilevel dependency mapping, and provides a technique to trace server to server dependencies based on, e.g., middleware services.

The grouping decision 314 includes one or more user defined criteria which determines how the groups are to be created. The grouping decision may be stored in memory, for example, as computer consumable data.

The grouping code or module 316 may apply the grouping criteria 314 to the parsed and filtered data. The application of the grouping criteria 314 to the parsed and filtered data produces resulting dependency groups. Dependency groups can be defined based on pre-defined categories, such as Database, Web Server, Application Server, etc., and also can be defined based on user specified categories and/or tags, etc, in which the tags are meaningful.

The DB loader 318 converts the data into a form that is loadable into a database engine, for example, relational database such as DB2, and loads the converted data into the data repository 302.

The data repository 320 (e.g., DB2) may include a data schema defining the data elements required to produce the results, e.g., dependency groups.

The second data repository 328 (e.g., a document-oriented database) may include a data schema defining the data elements required to produce the results, e.g., visual objects defining user views or perspectives.

The data modeler 322 may be a workbook based interface tool that enables a practitioner to extract tables, charts from the data repository 320. The tool also may enable the user to input object properties and utilization modeling criteria.

The utilization trending analyzer 324 may include a series of algorithms and procedures that synthesize the utilization data (e.g., collected data associated with servers and their utilization), prepare statistical models, and develop trends. Examples may include mean and normalized peak central processing unit (CPU), memory, disk and input/output (I/O) utilization. This allows the practitioner or user to understand if a server has sufficiently low utilization to be a candidate for server virtualization, e.g., as the utilization is low enough to allow additional middleware and applications to be installed on the server without affecting the performance of the currently installed middleware and applications The XML transformer 326 includes a technique to convert the resulting data into XML format, e.g., for the purpose of inputting into a data visualization system.

The transformed data may be output as shown at 306.

In another aspect, a system and method may be provided that dynamically (e.g., interactively) visualize a subset of server configuration (e.g., that may be large and complex) and server to server dependency information in such a way as to provide meaningful insights to a user.

For example, as described above, the system collected data (e.g., transformed output at 306 in FIG. 3) may contain multiple data elements identifying server configuration characteristics and server to server dependencies for each server. Predefined filters may be applied to the collected data, e.g., by a user, to remove extraneous information resulting in a data set specific to the need of the user for a particular purpose.

The data set may be visualized on a display platform supporting interactive application of the filters. The filters may be presented as one or more panels on a display device where the user taps on one or more filters to apply the filter(s) to the larger data set.

Figure 4:
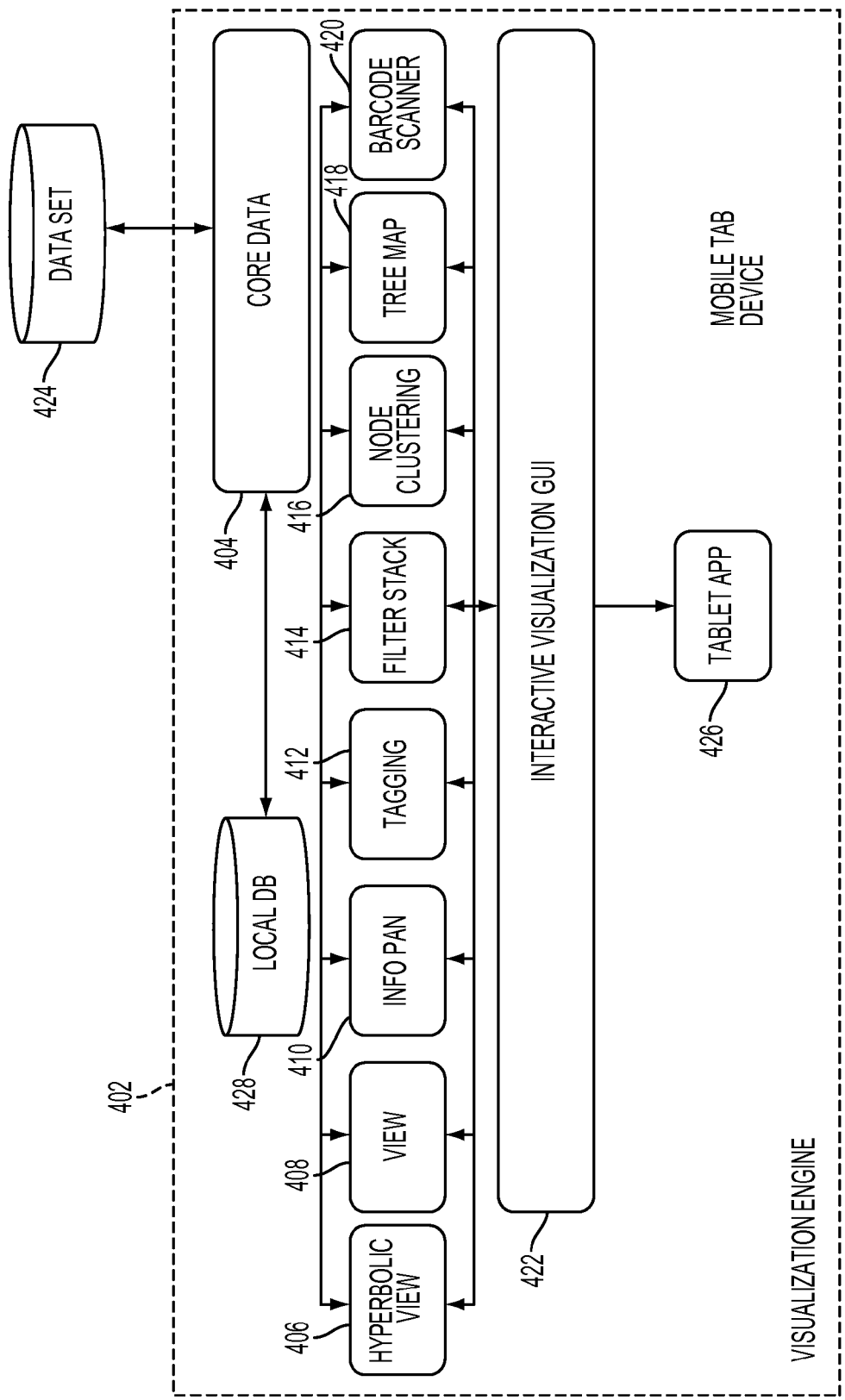
FIG. 4 illustrates a visualization engine in one embodiment of the present disclosure.

FIG. 4 illustrates a visualization engine in one embodiment of the present disclosure, e.g., 106 shown in FIG. 1. At least some of the components of the visualization engine 402 may be implemented as a computer appliance, e.g., a mobile appliance, to reside and run on a mobile device such as table device or another device. A core data module 404 may process data 424, e.g., from the processing engine (e.g., processed in DB shown at 328 in FIG. 3), and send the processed data to each visualization sub-module such as Hyperbolic View 406, View 408, Info Pan 410, Tagging 412, Filter Stack 414, Node Clustering 416, Tree Map 418, and Barcode Scanner 410, for respective processing.

The core data module 404 may include data schema defining the data elements required to produce the results, e.g., received or retrieved from the data set 424, and a function to process the data to be available in the format required by the application (e.g., visualization sub-module).

The barcode scanner 420 retrieves, from the data received from the core data module 404, a Quick Response (QR) or barcode of each server whose data is received. The QR code or barcode includes basic information of the server, such as the number of stack and aisle. Bar code may store information that cannot be obtained in the information collection phase, such as the physical location of server, GIO information, server rack number, etc. By scanning the bar code, these information are retrieved and automatically associated with the server information obtained from the collected data, e.g., the core data module 404.

The node clustering module 416 may apply a dependency clustering algorithm (e.g., an advanced dependency clustering algorithm) to the nodes (servers). For example, any existing general clustering algorithm in data mining area, such K-mean, K-nearest-neighbor, can be applied here directly to create clusters. Other algorithms may be used for clustering.

The local data store 426, e.g., a database may store intermediate data processed by the core data module 404. The local data store 426 may be implemented, for example, as a relational database management system, e.g., able to be contained in a relatively small programming library.

View module 408 in one embodiment of the present disclosure may provide a flexible mechanism to practitioners to create their working flow, idea of moving group, and to share across team member in the format of a view (a type of visualization). A view may have different version numbers, and the different versions stored in a central database. View can be committed to a final version, and can be merged with other practitioner's own View. A view may include force-directed network graph that depict unfiltered nodes and edges, and pull together nodes within highly dependent clusters.

Figure 9:
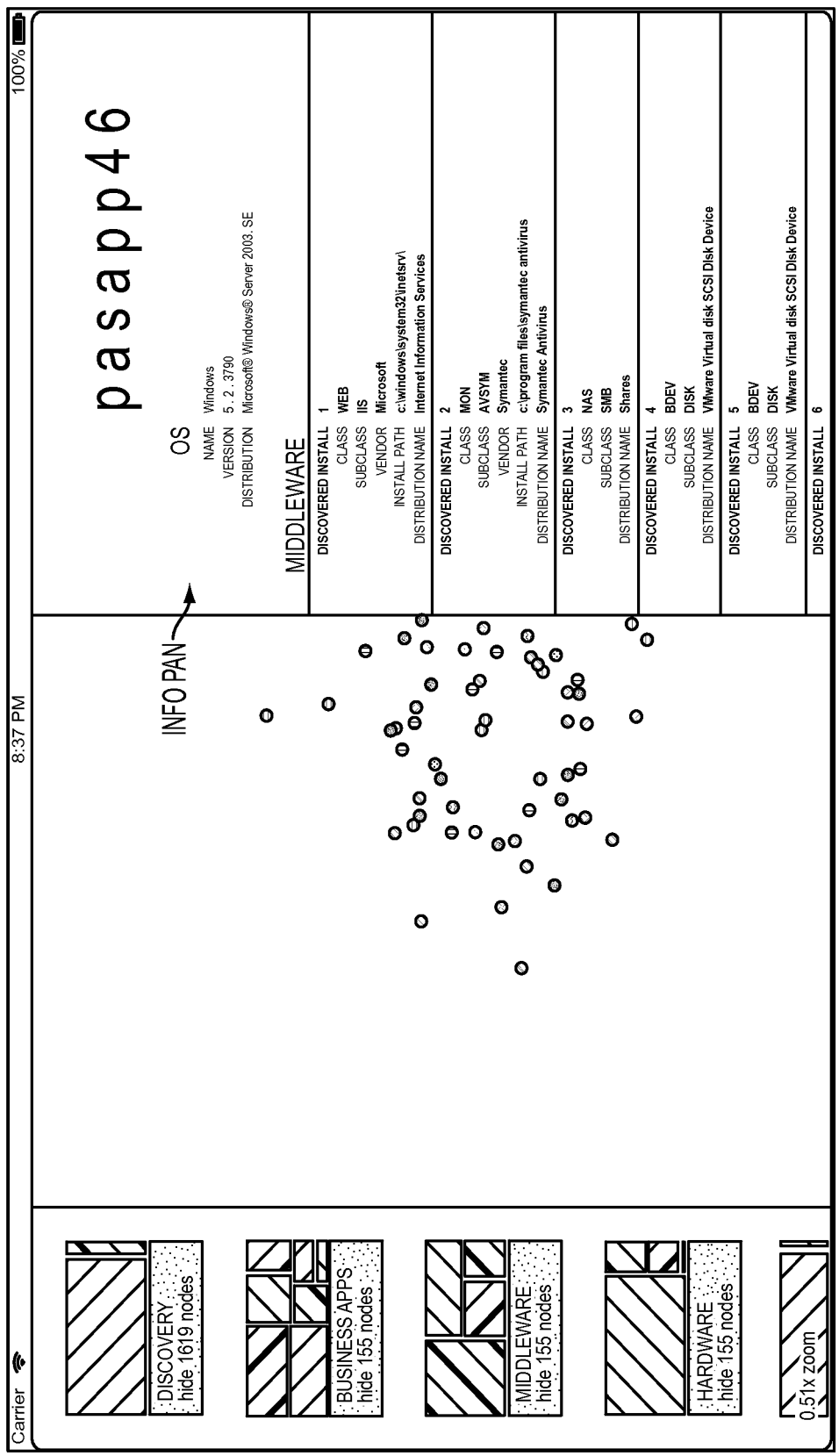

Info Pan module 410 generates an Info Pan visualization that shows all detailed information about a server, such as Hardware, Middleware information, etc. An example of Info Pan visualization is shown in FIG. 9. For example, this module provides textual details on a selected node, and an ability to explore middleware connectivity. This information may have been received from the core data module 104. In one embodiment, all information for visualization is pre-processed and stored in the core data module 404.

Filter Stack module 414 generates a visualization of stack of filtered servers, e.g., by hardware, middleware, applications, and others. Each filter in the Filter Stack shown on a visualization display may be a pre-defined or user-defined grouping category. The information used to create each filter may be prepared by a processing engine (e.g., FIG. 3, 304), or may be created on-the-fly by a user on a mobile app 426.

Tree Map module 418 generates a visualization of a tree style mapping of servers, e.g., filtered by a specified criterion, by hardware, middleware, applications, and others. In the present disclosure, the tree map is used to represent the relationship among sub-groups within one particular filter (category). For example, filter (category) Database may includes several sub-groups, e.g., DB2, Oracle, MSSql, MySql, etc. On the top level of filtering, each sub-rectangle within the parent rectangle represents the sub-group. The area of each sub-rectangle represents the number of servers in the sub-group, for example, the number of DB2 servers. The gap between two sub-rectangles represents the dependency relation. The smaller the gap is, the closer the two sub-rectangles are dependent on each other. Colored visualization may be also utilized. As an example, the color of grey (or another color) of each sub-rectangle represents the dependency density of servers within each sub-rectangle. The lighter the grey (or another color) is, the less the dependencies are. For example, a group of isolated DB2 servers can have light grey rectangle. Thus, for example, tree map thumbnails may show relative connectivity within hypothetical partitions (e.g., sub-rectangles), and for example, between these partitions (e.g., sub-rectangles).

A filtered stack together with the tree map thumbnails may enable quick, heuristic filtering of nodes and edges from the force-directed network view.

Hyperbolic view module 406 may generate a hyperbolic view that may enable the depiction of middleware connections inside an expanded node, and for example, connections to other external nodes.

Tagging module 412 may provide a user defined tag mechanism so that practitioners can create logical grouping based on their own domain knowledge. For example, this module may allow a user to tag a group of servers, to create a new group and use the group as a filter within the filter stack. Input to the tagging module 412 can be a user's text input, for example, a term created based on user's domain knowledge. Once a user confirms the creation of the new tag that does not pre-exist in pre-defined filter stack, a new filter may be also created to represent the tag. Then, a user can use this new tag to tag servers and a new attribute may be associated with the tagged servers.

Interactive visualization GUI dynamically (e.g., interactively) visualizes a subset of server configuration, for example, including in different visualization formats such as the hyperbolic view, view, info pan, tagging, filter stack, node clustering and tree map, e.g., as provided by the respective modules.

Tablet App 426 may be a mobile app that can run under a particular operating system running on a mobile device. The Table App 426 provides the functionalities of the interactive visualization GUI. Each tablet (mobile) operating system may have its own development application programming interface (API) or interactive development environment (IDE), which may be used to implement the interactive visualization of the present disclosure.

Figure 5:
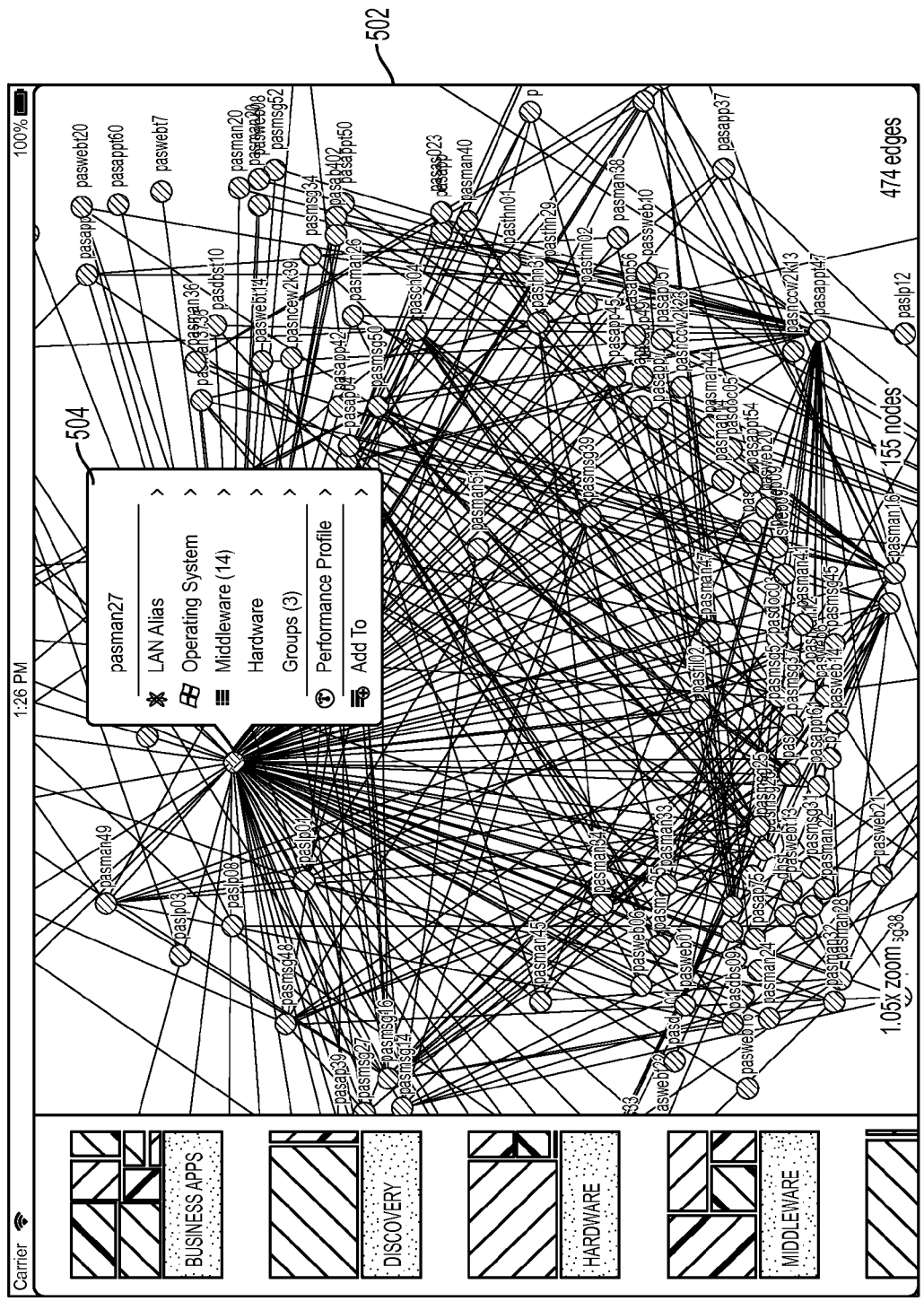
FIGS. 5-10 show examples of visualization in one embodiment of the present disclosure.

FIG. 5 shows example visualization in one embodiment of the present disclosure. In one embodiment of the present disclosure, filters may be further defined by subsets of the characteristics contained in the top level filter. Visual or graphical indications may be provided. For example, the size of each subset filter panel relative to the top level filter panel may indicates the percentage of a subset filter characteristic relative to the total number of characteristics contained in the top level filter. The width of the boarders surrounding each subset filter may represent distances between each subset. The wider of the boarders are, the less dependencies the subsets have. The color shading (or another visual indication) of each subset filter may represent the density of each subset in term of number of entities in the subset. The filtered data may be presented as a series of colored circles (or another shape and graphical indication) representing servers and lines between the server representing unidirectional and bidirectional dependencies. For example, in the panel 502, the servers are shown as nodes (filled circles), and the dependency relationships shown as lines connecting the nodes that represent the servers.

Initially servers may be represented only by colored circles, in one embodiment of the present disclosure. Responsive to the user making a gesture to enlarge the colored circle a set of server identifying information (host name) may be displayed. The gesture may be indicated by a pointing device or by touching (e.g., if a touch screen is used) or any other user interface mechanism may be utilized. Tapping on any colored circle may display the information collected for that particular server allowing the user to view the configuration characteristics of that server (e.g., shown at 504).

The distance between the servers may represent the strength of the dependency with stronger dependencies in closer proximity than weaker dependencies. The absolute and relative positions of the circles (servers) may be indicators of their level of connectivity in the collection. A well connected server will gravitate to the center or nucleus of the data set or collection of servers. In contrast, loosely coupled or autonomous servers will assemble along the perimeter of the collection.

Servers may be sometimes displayed as clusters where the cluster represents naturally grouped servers according to their characteristics, such as database cluster, application server cluster, etc.

Figure 6:
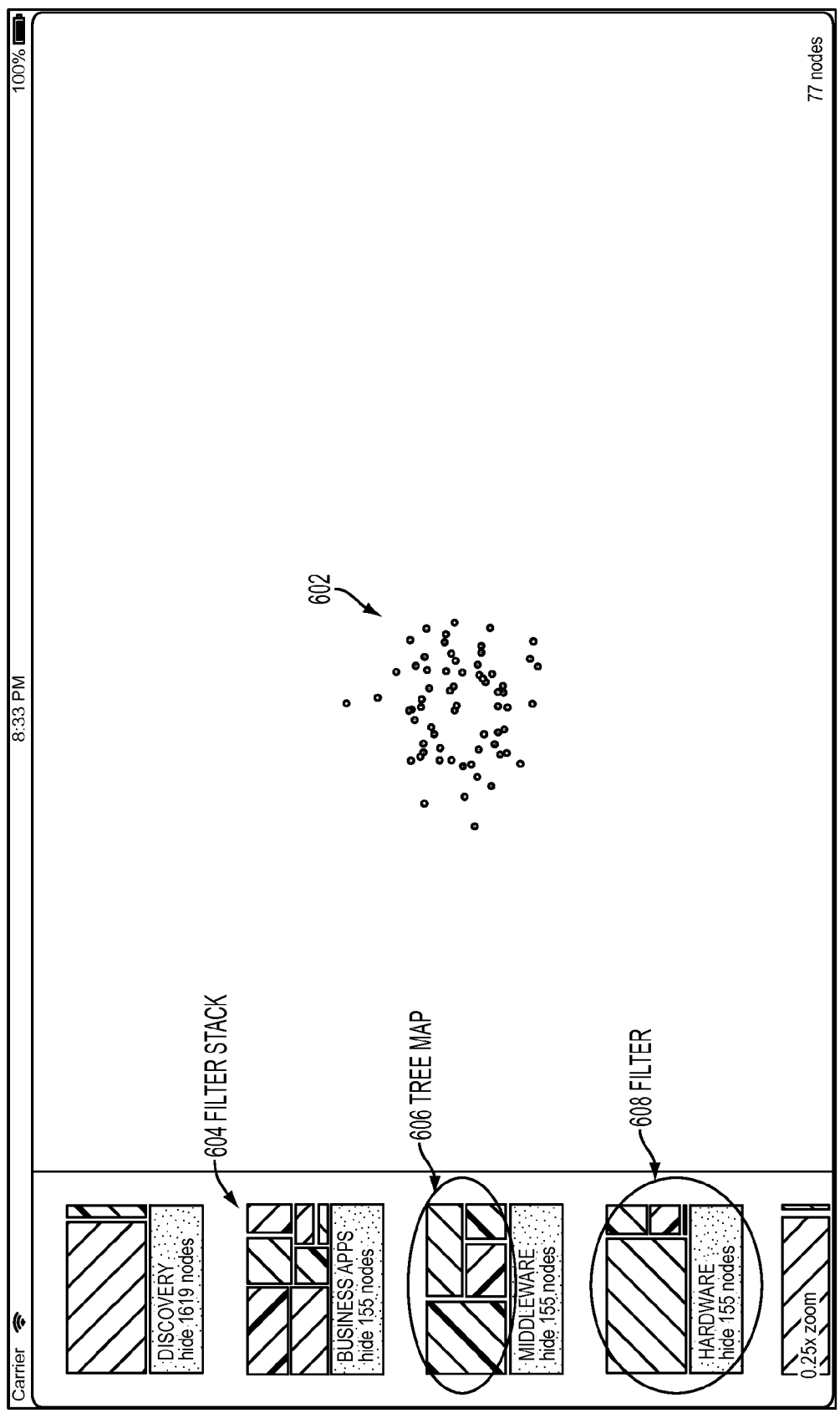

FIG. 6 illustrates an example of the visualization that shows a view of servers 602 and a panel showing a filter stack 604. The filter stack 604 may show filtered sets of servers, e.g., categorized into different types and sub-types, and so forth. For instance, servers filtered by hardware category are shown at 608. A tree map 606 provides a filtered set of servers and the sub-types in a tree map view. In the example shown, the tree map 606 shows servers filtered by middleware.

Figure 7:
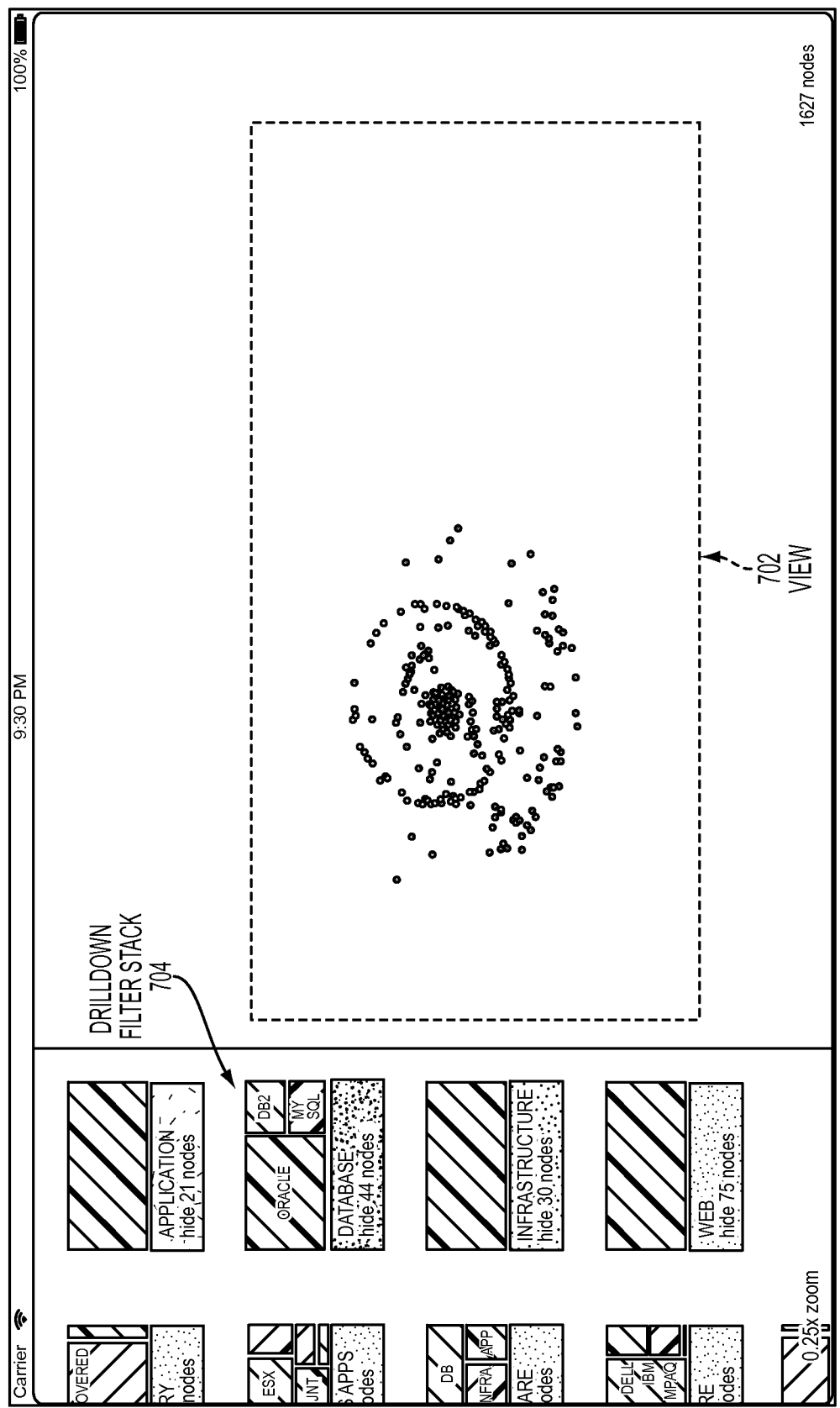

FIG. 7 is another example visualization. A view 702 shows servers. A drill down stack 704 shows a category of servers, e.g., database servers, further drilled down into sub-types, e.g., MY SQL, DB2. SQL refers to structured query language.

Figure 8:
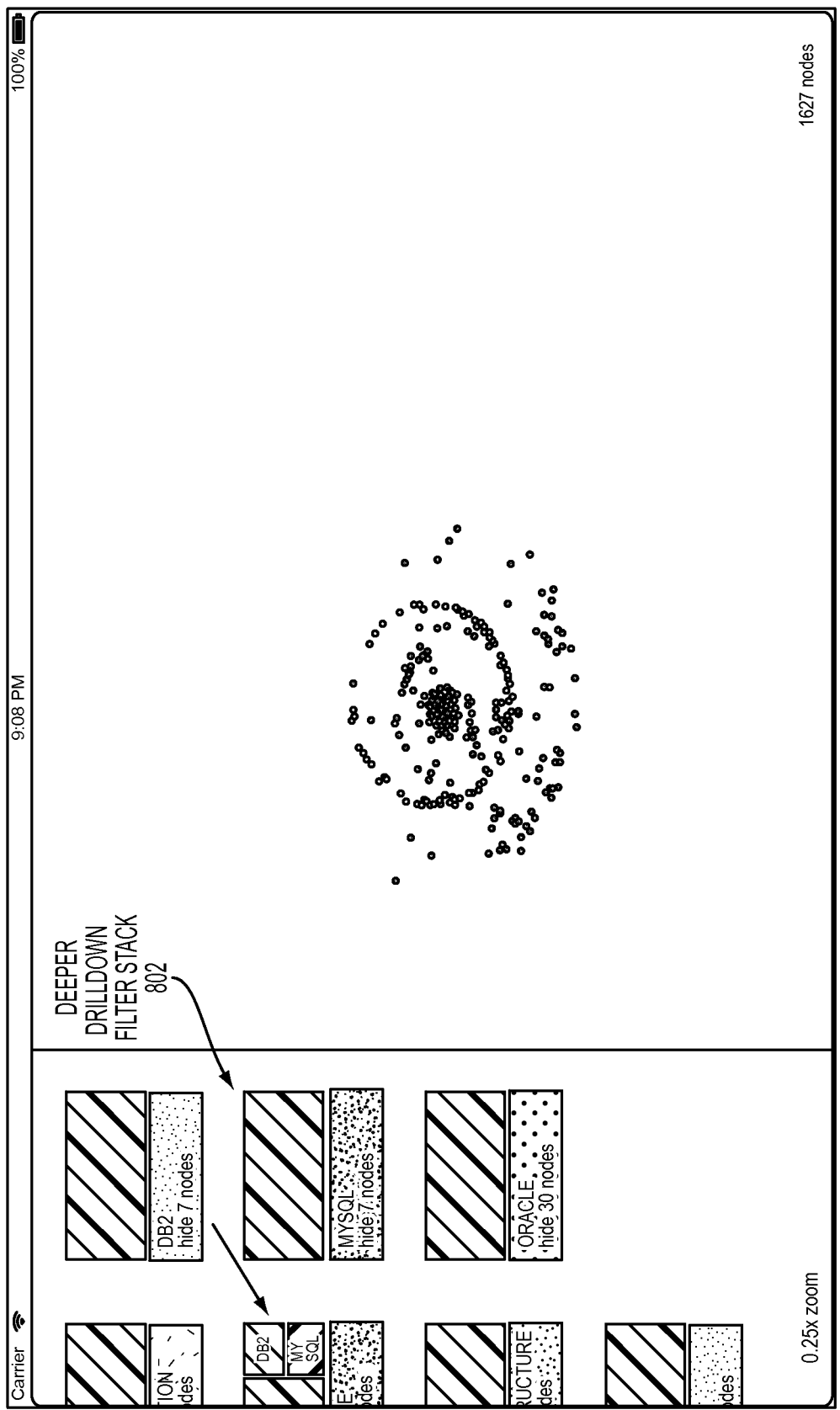

FIG. 8 shows another example of visualization. A deeper drilled down filter stack 802 illustrates further detail about the sub-type of database servers, e.g., DB2.

FIG. 9 shows another example visualization. Info Pan 902 provides an information panel that shows in text the detailed information about a server.

Figure 10:

FIG. 10 shows another example visualization including tagging 1002 and clustered servers 1004. A user may be enabled to tag one or more servers (e.g., interactively by selecting a node) and group the tagged servers. The clustered servers 1004 may have been determined by an algorithm in the node clustering module 416.

Figure 11:
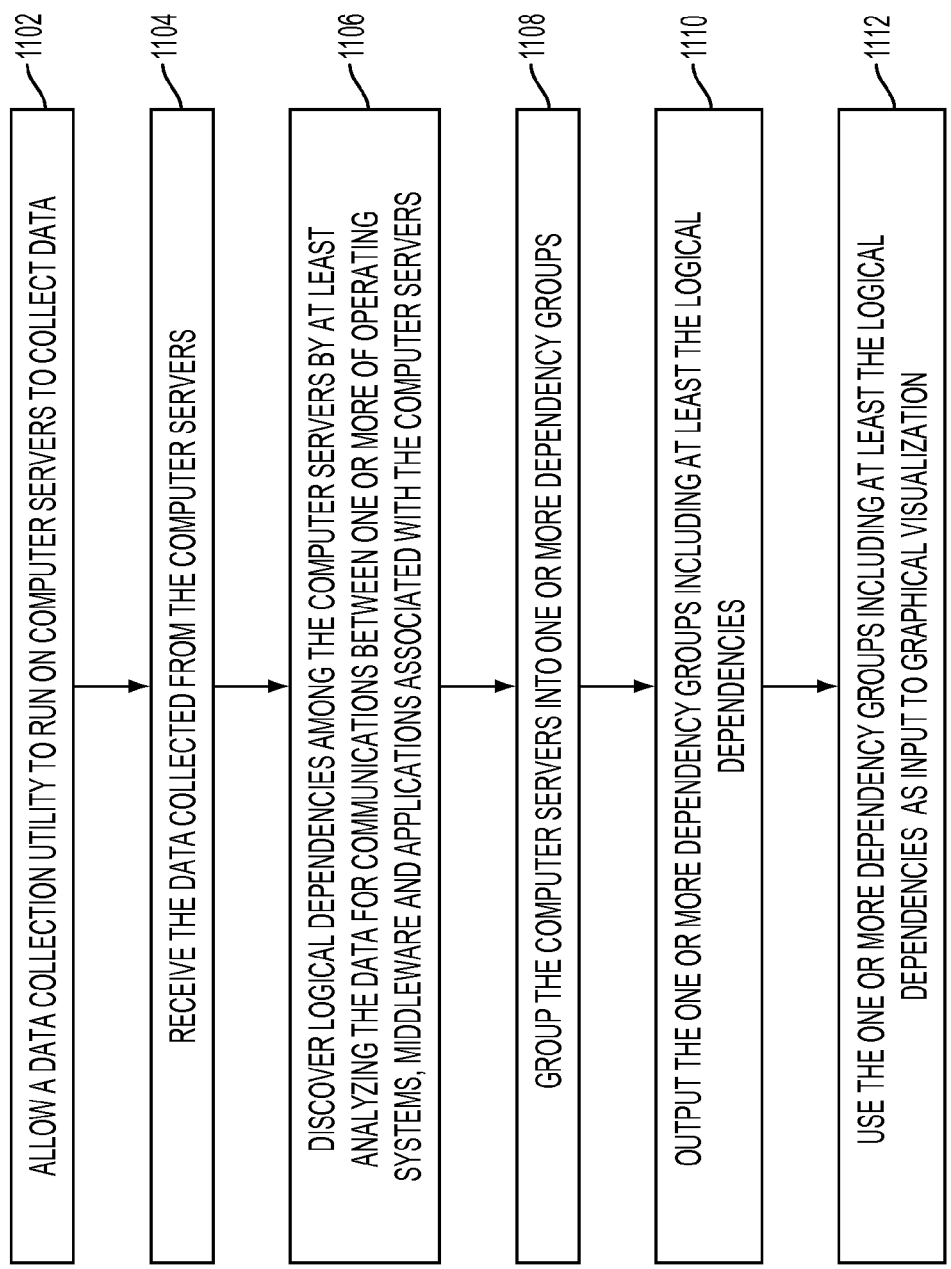
FIG. 11 is a flow diagram illustrating a method of providing analytics for logical dependency mapping among computer servers in one embodiment of the present disclosure.

As described above, a method of the present disclosure in one embodiment may identify and collect the data for defining groupings of IT infrastructure servers, referred to as dependency groups, e.g., to allow their physical and logical migration while maintaining the logical integrity and operations of the IT infrastructure. The method in one embodiment of the present disclosure, may identify and collect server configuration, middleware and logical server to server dependency attributes without significant impact to the performance or security profile of the IT infrastructure (e.g., no probes or agents). For instance, configured server to server dependencies may be identified as defined by the communications at the operating system, middleware or application level. Configured, observed and inferred dependencies may be also identified for a complete server to server dependency map. A user portal may be provided for allowing users to manage the tool on their own. Also as described above, a set of selected information may be visualized, e.g., allowing a user to gain insights to the configuration and dependencies of a user defined portion of a large and complex IT infrastructure. Dynamic (interactive) filtering may be applied to compare multiple views of the IT infrastructure understanding the relative population of technology instances in the infrastructure FIG. 11 is a flow diagram illustrating a method of providing analytics for logical dependency mapping among computer servers in one embodiment of the present disclosure. The method, for instance, creates a dependency mapping of computer servers. At 1102, a data collection utility may be provided to run on the computer servers to collect data. The data collection utility may be a script or like computer code, or a set of scripts that collect data from the computer servers. The data may include information related to server to server communications originating from one or more of operating systems, middleware, or applications of the computer servers or combinations thereof. For instance, the data may comprise configured dependencies wherein a server is configured to establish a communication with a paired server, the server and the paired server being members of the computer servers. The data may also comprise observed server to server communications. The data may also comprise data from systems log files analyzed to identify prior server to server communications.

At 1104, the data collected from the computer servers may be received. For instance, as described above, a processing engine may receive the data via a web-based graphical user interface.

At 1106, logical dependencies among the computer servers may be discovered by at least analyzing the data for communications between one or more of operating systems, middleware and applications associated with the computer servers. For example, as described above, a parser may discover dependencies among the computer servers and filtering may be applied to remove those dependencies determined to be extraneous or not needed.

At 1108, the computer servers may be grouped into one or more dependency groups based at least on a user-defined grouping criterion.

At 1110, the one or more dependency groups may be output.

At 1112, the output dependency groups may be input to a visualization engine that provides graphical visualization of the one or more dependency groups, and for example, allow interactive and dynamic visualization, for instance, including applying filtering interactively to the one or more dependency groups for enabling multiple views of the one or more dependency groups.

The following describes a breadcrumb technique, e.g., that may be employed in the breadcrumb module 312 in FIG. 3. ALDM breadcrumbs feature illustrates a series of linked dependency between servers by a method of walking a dependency link from server to server and recording the path (dropping a trail of breadcrumbs). With this technique, dependencies of a given server can be retraced by following the breadcrumb trail. The breadcrumb features is illustrated by example below.

Method of Determining a Breadcrumb Candidate Server

The selection of a server to be considered in the generation of an ALDM breadcrumb trail may be as follows. For each server a list of dependencies is aggregated by examining the dependency map of the server. The dependency may be classified as one of two types of dependencies, a parent classification or a child classification. The parent classification is described as one server having a dependency on another or parent server. The parent server thus provides a service or a set of services to the original server. The child classification is described as another or child server having a dependency on the server. The child server thus requires a service or a set of services from the original server.

A server can have both child and parent dependency classifications. Thus each server is then classified as either a child, parent or child/parent server. Once the servers are classified the servers with a child classification are further examined to determine if the server was scanned (dependency data collected on server itself). If the child server was not scanned, the server is ignored in the breadcrumb generation.

Ignoring child servers yields three types of servers. Parent servers, child/parent servers, child servers and orphaned child servers. The orphans are subsequently ignored since there is no parent dependency in which to create a breadcrumb trail. All remaining child servers are tagged as a root server, or server in which to begin the breadcrumb trail. Each of those servers will have a least one nearest neighbor or parent server associated with it. All servers identified thus far in the aforementioned determination sequence are considered as candidates to be included in the breadcrumb trail.

Process of Generating a Breadcrumb Trail is Described as Follows:

Each root server is examined for each of its parent dependencies. Each dependency is tagged with a dependency thread identifier. The identifier contains information that includes the dependency type, the origin and foreign middleware application, service, protocol and port numbers. The single depth dependency or nearest neighbor dependency is recorded as a breadcrumb trail with depth of one.

The next iteration or depth of breadcrumb trails is generated by re-visiting the previous depth breadcrumb trail. In this case only the end node or last server in the trail is examined for a nearest neighbor dependency. The dependency thread identifier is tagged as before and the next depth dependency of the give trail is thus recorded. The depth iteration repeats until either a preset iteration count has been reached or the parent dependencies have been exhausted. In order to prevent an infinite loop breadcrumb trail, any dependency that is identified as a dependency on a parent server (loopback dependency) already included in the current breadcrumb trail is eliminated or pruned.

Grouping of Generated Breadcrumb Trail Servers

Grouping of servers by virtue of breadcrumbs is a process of creating a list of relevant servers belonging to a breadcrumb or series of breadcrumb trails. The process begins by examining each breadcrumb trail, for the root server (initial server in the trail) and all other servers identified in the trail. Initially the first root server examined will be included in the first group, and all servers in a trail that includes the first root server will be added to the first group. If a root server has a dependencies on any given server in the trail then that root server is added to the group as the dependent server. All other servers in the trail are also added to the same group. If a root server or any of its dependent servers exist in any previously determined group, that server and its dependent will constitute the beginning of a new group. The process continues until all servers in all trails have a group determination.

Persistence of a Breadcrumb Trail as Determined by Dependency Thread and the Effect of Filtering The breadcrumb trail as described earlier is a series of servers linked together by a dependency, in this case a parent dependency. Each of those dependencies has metadata that determine the life of the dependency thread.

For example, consider that there are two breadcrumb trails. The first trail and dependency thread include server A linked to server B via a web (http) session and server B is linked to server C via an LDAP authentication session.

Trail1: ServerA→ServerB→ServerC
DepTh1: [Browser]→(http)→[Webserver]→(ldap)→[LDAP auth service]

The second trail includes Server A linked to Server B via a database (db) session.

Trail2: ServerA→ServerB
DepTh2: [db client]→(db)→[database server]

In summary, a server bread crumb trail is shown as:
ServerA→ServerB→ServerC

If a filter is applies to suppress http connections, the ServerA to ServerB dependency would be eliminated as noted in Trail1 above. However, the overall breadcrumb trail would still remain as ServerA→ServerB→ServerC, since the ServerA→ServerB dependency is still supported in trail 2 and ServerB→ServerC is supported by the remaining trail 1 dependencies.

Therefore, the Dependency thread is considered. In this example when the http connection is filtered, the ldap based dependency is pruned as well. The ldap authorization service is a service provided to the web server and the web server is a service provided to the browser. And since the web server is no longer providing for a dependent child, it no longer has a relevant dependency on the parent ldap service.

EXAMPLES

For purpose of identifying server types in these examples lettered servers (A-Z) will be considered discovered (scanned) servers. Servers in which an ALDM collection was executed. Numbered servers (1-99) are inferred or undiscovered servers. In the following example ServerA has one parent dependency and two children.

Example 1

Server1→ServerA→ServerB
Server2→ServerA→ServerB

Since server1 and 2 are undiscovered they do not represent a source node or vertex and are subsequently stricken from the breadcrumb trail. Yielding a single trail as shown in example 2

Example 2

ServerA→ServerB

The next example shows a dependency with depth of 2. This depth is set with the BREADCRUMBS=2 parameter in the cfg.ini file.

Example 3

Servers→ServerB
ServerA→ServerB→Server3
ServerB→Server3

Note ServerB's single depth dependency will also show in the tabular data format.

In this next example a parent dependency is detected that indicates a 'loopback' condition.

Example 4

ServerA (forward arrow) ServerB (forward arrow) ServerC (arrow circling back to ServerB)

Therefore The loopback is hidden and no dependency is illustrated.

ServerA (forward arrow) ServerB (forward arrow) ServerC

Example 5

In this example there is a breadcrumb trail with a dependency depth of 2.

ServerA (forward arrow) ServerB (forward arrow) ServerC

There is an associated dependency thread as:

ServerA (forward arrow) ServerB (forward arrow) ServerC
[Browser] (forward arrow) (http) (forward arrow) [Webserver] (forward arrow) (idap) (forward arrow) [LDAP auth service]
[db client] (forward arrow) (db) (forward arrow) [database server]

There are two threads (http and db) that bind ServerA to ServerB but only one thread (ldap) that binds ServerB to ServerC. Furthermore the ldap thread and the http thread are bound to a common service or middleware application (Webserver).

Breadcrumb Process Implementation

There may be a series of software modules the support the Breadcrumb generation process. The modules may be written as components to the ALDM processing and analytics engine. The modules may include: g-visualize, breadcrumbs, and relhosts2wave.

Breadcrumb Program Flow

In one embodiment, ALDM breadcrumb trail generation is an interim stage that is forked from the node and edge list creation (source_target.dbf). The outcomes may be a text formatted linked list as well as additional combined.csv file used by Graphiz™ to render the visualization SVG graphics.

Initiating Breadcrumb Trails

ALDM breadcrumb trail generation may be initiated in one or more of the following ways:
1. By enabling breadcrumbs in the cfg.ini file, e.g., setting the BREADCRUMBS depth to a value greater than one (1). For example, set BREADCRUMBS=6. This setting sets the dependency depth to six. Thus limiting the breadcrumb illustration to 6 or less nodes in the trail.
2. By setting allservers flag in the cfg.ini file, e g., setting the ALLSERVERS flag to a value greater than zero (0). For example, ALLSERVERS=1. This setting forces the breadcrumbs feature to generate breadcrumb trails for every server that has a parent dependency and is a discovered server (scanned).
3. By setting waves value in the cfg.ini file, e.g., setting the WAVES value to a filename. For example, WAVEFILE=waves.csv. This setting causes the breadcrumbs feature to generate a breadcrumb trail for servers listed in the WAVEFILE. Furthermore, servers that are pre-grouped in the WAVEFILE remain grouped and the breadcrumb illustrations may be also created using the same grouping.

Breadcrumb Trail Results

ALDM breadcrumb trails may be generated in both textual and graphical formats. Breadcrumb trail files may be located in the results tree gal→vis→bctrail. The textutal files in the root of the tree and the graphics are in detail level 0 (level0).

Textual format (e.g., ASCII text files) may include: Breadcrumbs.out—the overall breadcrumb trail file; Breadcrumbs.out.bywave—the breadcrumb trails grouped; relhosts2waves.csv—A csv file listing of all hosts associated to a wave (grouping), including those that were generated with the breadcrumb feature.

Graphical format (e.g., SVG files) may include: ALL.svg; {grouping|wave}.svg.

Figure 12:
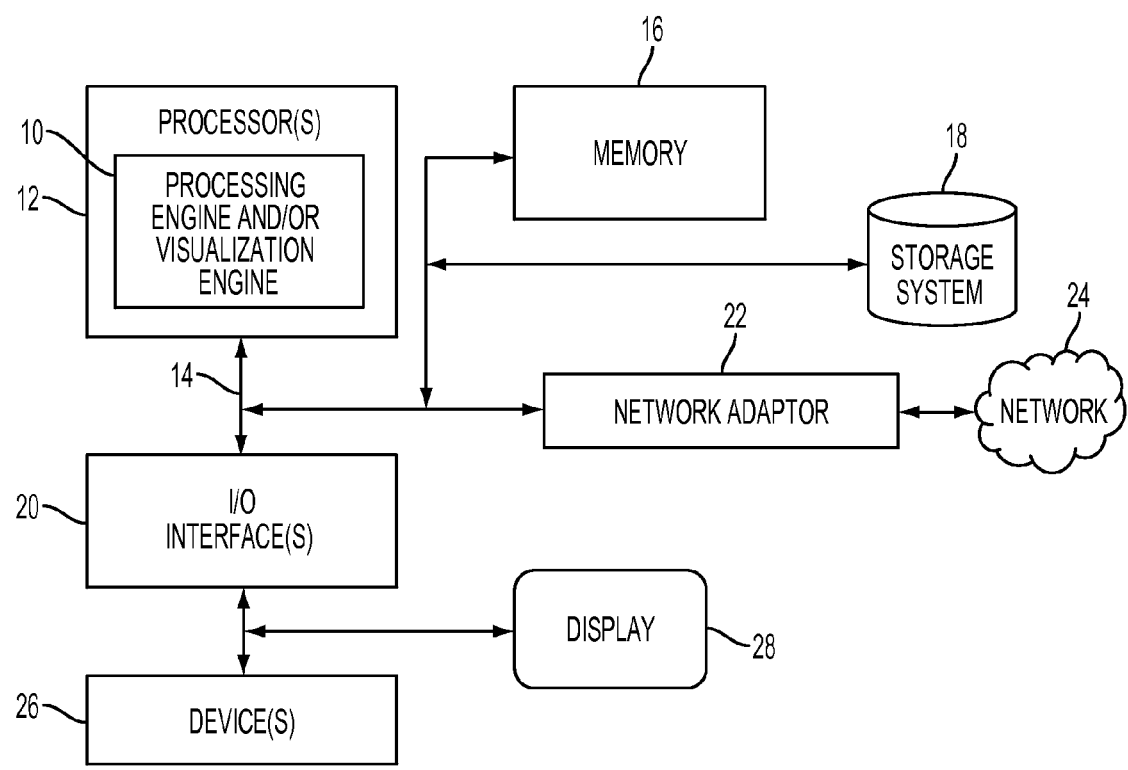
FIG. 12 illustrates a schematic of an example computer or processing system that may implement a processing engine in one embodiment of the present disclosure.

FIG. 12 illustrates a schematic of an example computer or processing system that may implement the processing engine in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a processing engine 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of creating a logical dependency mapping of computer servers, comprising:
    allowing a data collection utility to run on the computer servers to collect data;
    receiving the data collected from the computer servers;
    discovering logical dependencies among the computer servers by analyzing the data for communications between one or more of operating systems, middleware and applications associated with the computer servers;
    grouping the computer servers into one or more dependency groups based at least on a user-defined grouping criterion; and
    outputting the one or more dependency groups including at least the logical dependencies,
    wherein the discovering logical dependencies comprises identifying prior server to server communications among the computer servers in system log files and monitoring network connections and identifying server to server activities among the computer servers based on traffic in the network connections,
    wherein the outputting the one or more dependency groups further comprises providing graphical visualization of the one or more dependency groups,
    the graphical visualization comprising a view panel displaying servers and lines connecting the servers, wherein a well-connected server gravitates to a center of a collection of servers and loosely coupled and autonomous servers assemble along a perimeter of the collection in the view panel, the graphical visualization further comprising a panel showing a filter stack comprising filtered sets of servers categorized into different types as parent rectangles and sub-types as sub-rectangles within the parent rectangles, color of the sub-rectangles visualizing dependency density of servers within each of the sub-rectangles.

2. The method of claim 1, wherein the logical dependencies comprise server to server communications originating from one or more of operating systems, middleware, or applications of the computer servers or combinations thereof.

3. The method of claim 1, wherein the data comprises configured dependencies wherein a server is configured to establish a communication with a paired server, the server and the paired server being members of the computer servers.

4. The method of claim 1, wherein the data comprises observed server to server communications.

5. The method of claim 1, wherein the data comprises data analyzed from systems log files to identify prior server to server communications.

6. The method of claim 1, wherein the allowing the data collection utility to run on the computer servers to collect data, comprises allowing the data collection utility to test for a presence of a predefined set of server components associated with the computer servers, and to collect the data based on discovering the predefined set of server components.

7. The method of claim 1, further comprising applying filtering interactively to the one or more dependency groups for enabling multiple views of the one or more dependency groups.

8. A system for creating a logical dependency mapping of computer servers, comprising:
    a processor;
    a processing engine operable to execute on the processor and further operable to receive data collected from the computer servers, the processing engine further operable to discover logical dependencies among the computer servers by analyzing the data for communications between one or more of operating systems, middleware and applications associated with the computer servers, the processing engine further operable to group the computer servers into one or more dependency groups based at least on a user-defined grouping criterion, the processing engine further operable to output the one or more dependency groups including the logical dependencies;
    a web-based graphical user interface operable to execute on the processor, wherein the processing engine receives the data via the web-based graphical user interface; and a storage device comprising a database repository for storing the one or more dependency groups including the logical dependencies, wherein the discovering logical dependencies comprises identifying prior server to server communications among the computer servers in system log files and monitoring network connections and identifying server to server activities among the computer servers based on traffic in the network connections, wherein the web-based graphical user interface outputs a graphical visualization comprising a view panel displaying servers and lines connecting the servers, wherein a well-connected server gravitates to a center of a collection of servers and loosely coupled and autonomous servers assemble along a perimeter of the collection in the view panel, the graphical visualization further comprising a panel showing a filter stack comprising filtered sets of servers categorized into different types as parent rectangles and sub-types as sub-rectangles within the parent rectangles, color of the sub-rectangles visualizing dependency density of servers within each of the sub-rectangles.

9. The system of claim 8, further comprising a visualization engine operable to receive the output and further operable to provide the graphical visualization of the one or more dependency groups.

10. The system of claim 9, wherein the graphical visualization comprises a view showing the one or more dependency groups of the computer servers and links representing discovered dependencies among the computer servers.

11. The system of claim 9, wherein the graphical visualization comprises interactively filtered view of the one or more dependency groups.

12. The system of claim 9, wherein the visualization engine is further operable to allow interactive tagging of the computer servers represented in the graphical visualization to define one or more groupings.

13. A non-transitory computer readable storage medium storing a program of instructions executable by a machine to perform a method of creating a logical dependency mapping of computer servers, the method comprising:

allowing a data collection utility to run on the computer servers to collect data;

receiving the data collected from the computer servers;

discovering logical dependencies among the computer servers by analyzing the data for communications between one or more of operating systems, middleware and applications associated with the computer servers;

grouping the computer servers into one or more dependency groups based at least on a user-defined grouping criterion; and outputting the one or more dependency groups including at least the logical dependencies, wherein the discovering logical dependencies comprises identifying prior server to server communications among the computer servers in system log files and monitoring network connections and identifying server to server activities among the computer servers based on traffic in the network connections, wherein the outputting the one or more dependency groups further comprises providing graphical visualization of the one or more dependency groups, the graphical visualization comprising a view panel displaying servers and lines connecting the servers, wherein a well-connected server gravitates to a center of a collection of servers and loosely coupled and autonomous servers assemble along a perimeter of the collection in the view panel, the graphical visualization further comprising a panel showing a filter stack comprising filtered sets of servers categorized into different types as parent rectangles and sub-types as sub-rectangles within the parent rectangles, color of the sub-rectangles visualizing dependency density of servers within each of the sub-rectangles.

14. The computer readable storage medium of claim 13, wherein the logical dependencies comprise server to server communications originating from one or more of operating systems, middleware, or applications of the computer servers or combinations thereof.

15. The computer readable storage medium of claim 13, wherein the data comprises configured dependencies wherein a server is configured to establish a communication with a paired server, the server and the paired server being members of the computer servers, the data further comprises observed server to server communications, and the data further comprises data analyzed from systems log files to identify prior server to server communications.

16. The computer readable storage medium of claim 13, wherein the allowing the data collection utility to run on the computer servers to collect data, comprises allowing the data collection utility to test for a presence of a predefined set of server components associated with the computer servers, and to collect the data based on discovering the predefined set of server components.

17. The computer readable storage medium of claim 13, further comprising applying filtering interactively to the one or more dependency groups for enabling multiple views of the one or more dependency groups.

* * * * *